United States Patent [19]

Siemon

[11] 4,291,264
[45] Sep. 22, 1981

[54] POWER FACTOR CONTROL SYSTEM FOR INVERTER-DRIVEN A-C INDUCTION MOTOR

[75] Inventor: Edward C. Siemon, Newfield, N.Y.

[73] Assignee: Borg-Warner Corporation, Chicago, Ill.

[21] Appl. No.: 72,523

[22] Filed: Sep. 4, 1979

[51] Int. Cl.³ .......................... H02P 1/24; H02P 1/42; H02P 3/18; H02P 5/28

[52] U.S. Cl. .................................. 318/729; 318/798; 318/812

[58] Field of Search ................ 318/729, 798, 799–803, 318/805, 807, 808, 809, 810, 811, 812

[56] References Cited

U.S. PATENT DOCUMENTS

| | | | |
|---|---|---|---|
| 3,611,089 | 10/1971 | Mokrytzki et al. | 318/798 |
| 3,619,749 | 11/1971 | Schieman | 318/798 |
| 3,919,609 | 11/1975 | Klautschek et al. | 318/803 |
| 3,935,518 | 1/1976 | Yatsuk et al. | 318/805 |
| 4,041,361 | 8/1977 | Cornell | 318/802 |
| 4,052,648 | 10/1977 | Nola | 318/805 |
| 4,186,334 | 1/1980 | Hirata | 318/805 |
| 4,207,510 | 6/1980 | Woodbury | 318/802 |

Primary Examiner—J. V. Truhe
Assistant Examiner—John B. Conklin
Attorney, Agent, or Firm—James E. Tracy

[57] ABSTRACT

The power factor in an inverter-driven induction motor is held relatively constant at a desired optimum value, despite variations in mechanical loading on the motor, by monitoring the d-c bus current to determine the ratio of real and reactive currents, thereby to detect the actual power factor. The actual and desired power factors are then effectively compared and the resulting error signal is fed back to the inverter's d-c power supply to adjust the inverter output voltage to change the reactive current to the extent necessary to maintain the desired power factor.

9 Claims, 2 Drawing Figures

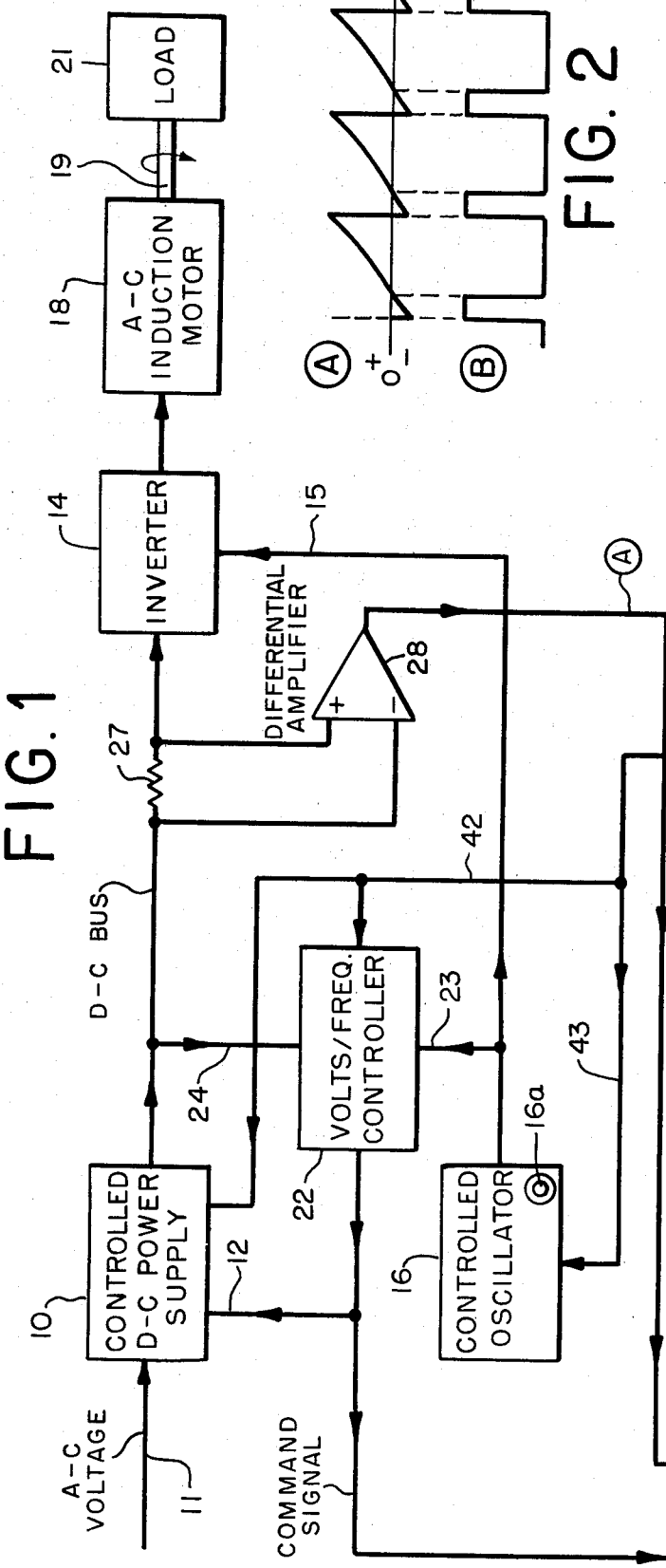
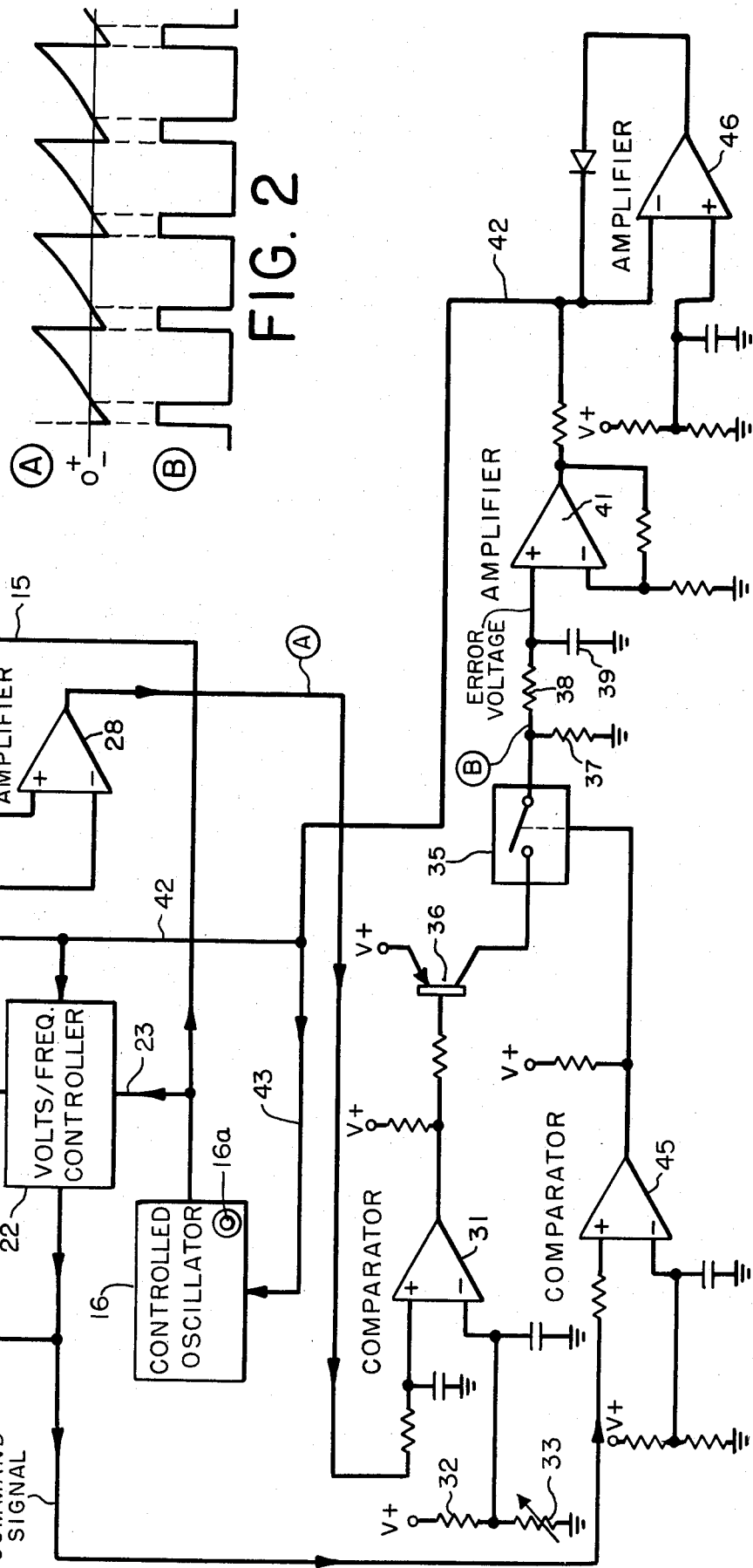

POWER FACTOR CONTROL SYSTEM FOR INVERTER-DRIVEN A-C INDUCTION MOTOR

BACKGROUND OF THE INVENTION

This invention relates to a power factor control system for operating an inverter-driven a-c induction motor at a constant desired power factor, to reduce power consumption, regardless of load variations on the motor.

Power factor control circuits have been developed for varying the power input to an induction motor as load conditions change in order to conserve energy and to improve the motor efficiency. In the absence of power factor control, the reactive volt amps (reactive power) of an induction motor can be relatively high when the motor is unloaded or only partially loaded, and this is very wasteful of electricity. The power factor control system of the present invention, which is especially useful when the induction motor is powered by the output a-c voltage from an inverter, is considerably simpler in construction than the prior power factor controls and exhibits a significant improvement in performance.

SUMMARY OF THE INVENTION

The control system of the invention controls the power factor in an a-c induction motor driven by the output a-c voltage from an inverter which in turn is energized by a d-c voltage received over a d-c bus from a d-c power supply, the d-c bus current alternately flowing through the inverter to the motor as real current and back from the motor and through the inverter to the d-c power supply as reactive current. The power factor control system comprises means for sensing the d-c bus current and developing therefrom an alternating voltage which varies around a zero axis and reflects the actual power factor in the induction motor, the voltage above the zero axis representing the real current to the motor while the voltage below the axis represents the reactive current from the motor. There are means for providing a reference voltage representing the desired power factor in the induction motor. Means are included for comparing the alternating voltage with the reference voltage to produce an error voltage which varies as a function of the difference between the desired power factor and the actual power factor. Finally, control means respond to the error voltage for varying the amplitude of the a-c inverter voltage to change the reactive power in order to maintain the desired power factor.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

FIG. 1 schematically illustrates a power factor control system, constructed in accordance with the present invention, and the manner in which that control system couples to and regulates an inverter-driven induction motor, and FIG. 2 depicts certain voltage waveforms helpful in understanding the operation of the control system.

DESCRIPTION OF THE ILLUSTRATED EMBODIMENT

The arrangement and operation of elements 10–24 are generally conventional and well understood in the art. Briefly, controlled d-c power supply 10 may take the form of a well-known phase-controlled rectifier which receives an input a-c voltage on line 11 (either single phase or three phase) and provides, on the d-c bus, a d-c voltage whose magnitude is determined by a command signal received over line 12. The amplitude of the d-c voltage in turn determines the amplitude of the output a-c voltage produced by inverter 14. The frequency of the inverter output voltage is established by the pulse repetition frequency of the timing or gating pulses received over line 15 from controlled oscillator 16. The oscillator may be controlled, to adjust its oscillating frequency, in response to an appropriate control signal representing some parameter. Alternatively, and as illustrated for simplicity, the oscillating frequency (and hence the frequency of the a-c inverter voltage) may be changed merely by manually adjusting knob 16a.

The output of inverter 14 couples to a-c induction motor 18 and effects rotation thereof at a speed determined by and directly proportional to the inverter frequency. The motor in turn rotates shaft 19 to drive some variable mechanical load 21.

The command signal, applied over line 12 to d-c power supply 10, is produced by a conventional volts/frequency controller 22 which operates in response to the timing pulses, received over line 23 from oscillator 16, and also in response to the d-c voltage received over line 24 from the d-c bus. When it is desirable to maintain a constant torque output regardless of motor speed, it is common practice to operate the system so as to maintain substantially constant the ratio of amplitude to frequency of the inverter voltage supplied to the motor. This may be achieved by circuit 22 whose construction is well known in the art. Controller 22 compares the magnitude of the d-c voltage on the d-c bus (which magnitude determines the amplitude of the a-c inverter voltage) with the oscillating frequency and sets the command signal at the level required to maintain the desired ratio. When knob 16a is manipulated to select a new and higher motor speed, for example, controller 22 automatically changes the command signal to increase the d-c voltage applied to inverter 14. The command signal will therefore be directly proportional to both the frequency and amplitude of the inverter voltage.

Turning now to the invention, since there is dissipated both real power and reactive power in motor 18 all of the d-c bus current will not flow in the direction from power supply 10 and through inverter 14 to the induction motor. Some of that current in the d-c bus will actually flow in the reverse direction from motor 18 back to power supply 10. More specifically, during a portion of each time interval between switch actuations in the inverter the d-c bus current will flow to the motor as real current. On the other hand, during the remaining portion of each of those time intervals the d-c bus current alternates and flows back from motor 18 to power supply 10 as reactive current. The ratio of the real and reactive currents reflects the power factor in the motor. By maintaining that ratio at a preset level, even in the presence of load variations on motor 18 which tend to change the reactive current, the power factor may be held at an optimum desired value to improve motor efficiency and reduce power consumption.

This power factor control is achieved by employing resistor 27 and integrated circuit differential amplifier 28 to sense the d-c bus current and to develop therefrom an alternating voltage (waveform A in FIG. 2) which varies around a zero axis and reflects the actual power factor in the induction motor. In effect, the bus current is converted to a voltage proportional to that current. The frequency of voltage waveform A is therefore directly proportional to the frequency of the inverter output voltage, being determined by the number of times the solid state switches in the inverter are actuated to complete each cycle of the inverter output voltage. For example, when the a-c inverter voltage has the well-known six-step waveshape (to approximate a sine wave), the frequency of waveform A will be six times the inverter output frequency. The voltage in waveform A above the zero axis represents the real current to the motor, while the voltage below the axis represents the reactive current from the motor. Of course, the greater the ratio of real to reactive current, the higher the power factor.

In order to determine if the actual power factor (which is represented by waveform A) is established at the desired level, the actual and desired power factors are effectively compared in integrated circuit amplifier 31 which functions as a comparator. To explain, the alternating voltage (waveform A) representing the actual power factor is applied to the non-inverting or (+) input of amplifier 31, while a reference d-c voltage, provided at the junction of fixed resistor 32 and adjustable resistor 33, is applied to the amplifier's inverting or (−) input. During each cycle of waveform A the voltage at the (+) input of amplifier 31 initially becomes less than (or negative with respect to) the reference voltage at the (−) input, and will then become greater than (or positive relative to) the reference voltage. As a result, the output voltage of amplifier 31 will abruptly switch from a relatively high level to a relatively low level (essentially zero volts) when the voltage at the (+) input becomes less than the reference voltage. On the other hand, when the (+) input voltage becomes greater than the reference voltage at the (−) input, amplifier 31 abruptly switches to its relatively high level output.

It will thus be apparent that the reference voltage level may represent the desired power factor, with the waveshape of the output voltage of amplifier 31 reflecting the deviation of the actual power factor from the desired power factor. By adjusting resistor 33, it is possible to select the desired power factor at which the motor will operate.

Assuming that solid state analog switch 35 is closed, the output signal of amplifier 31 turns transistor 36 alternately on and off, as a consequence of which that output signal appears in amplified, but phase inverted, form (see waveform B) at the junction of resistors 37 and 38. The rectangular shaped signal of waveform B thus has a duty cycle which is proportional to the difference between the desired and actual power factors. Resistor 38 and capacitor 39 constitute an integrating or averaging circuit for integrating the rectangular shaped signal to produce an error voltage which varies as a function of the difference between the desired and actual power factors. This error voltage is amplified by integrated circuit amplifier 41 and applied over line 42 to d-c power supply 10 to vary the d-c voltage applied to inverter 14 thereby adjusting the inverter voltage and changing the reactive power as necessary to maintain the desired power factor. For example, if the load on motor 18 decreases, the reactive current will tend to increase causing the actual power factor to deviate from the desired value. As a consequence, the duty cycle of the output signal of amplifier 31 will change and the error voltage will increase and cause the motor voltage to drop, thereby decreasing the reactive current until the desired power factor is re-established.

It will be noted that the error voltage on line 42 is also applied to controller 22. The effect of this voltage is to vary the amplitude/frequency ratio of the inverter voltage, as the error voltage changes, so that the frequency (and hence the motor speed) will remain substantially constant despite variations in the amplitude of the inverter voltage. On the other hand, in some applications of the invention it may be desirable to increase the frequency of the inverter voltage as its amplitude decreases in order to compensate for any increased motor slip caused by the reduction in motor voltage. This may be achieved by applying the error voltage over line 43 to controlled oscillator 16.

In describing the operation of the invention, it was assumed that analog switch 35 was closed, thereby enabling the operation of the power factor control system. The purpose of switch 35, and its controlling circuit, is to delay the operation of the power factor control system until the frequency of the a-c inverter voltage reaches a predetermined minimum level, thereby allowing start-up of the inverter. More specifically, the command signal, which is produced by controller 22 and is proportional to the frequency of the inverter voltage, is applied to the (+) input of an integrated circuit amplifier 45 which functions as a comparator, the (−) input being connected to a voltage divider to receive a reference voltage, which effectively represents a predetermined minimum frequency.

During start-up and until the minimum frequency is reached, the voltage at the (+) input of comparator 45 will be less than that at the (−) input, as a result of which the output voltage of the comparator will be relatively low (essentially zero volts) and switch 35 will remain open. Upon reaching the minimum frequency, however, the (+) input voltage will exceed the reference voltage at the (−) input, whereupon the comparator's output voltage will switch to its relatively high level. The output voltage of comparator 45 effectively constitutes an enabling signal for actuating switch 35 to effect closing thereof, thereby enabling the operation of the control system.

Integrated circuit amplifier 46 and its associated circuit components merely constitute a clamp circuit for limiting the amplitude of the error voltage to a predetermined maximum level. The error voltage on line 42 is not allowed to become greater than the voltage at the (+) input of amplifier 46. This is a desirable feature since at some motor frequencies and load conditions a high power factor is practically unattainable even when the motor voltage is reduced to almost zero volts. With the clamp circuit, a maximum reduction in motor voltage from nominal is allowed.

While a particular embodiment of the invention has been shown and described, modifications may be made, and it is intended in the appended claims to cover all such modifications as may fall within the true spirit and scope of the invention.

I claim:

1. A control system for controlling the power factor in an a-c induction motor driven by the output a-c voltage from an inverter which in turn is energized by a d-c voltage received over a d-c bus from a d-c power supply, the d-c bus current alternately flowing through the inverter to the motor as real current and back from the motor and through the inverter to the d-c power supply as reactive current, said control system comprising:

means for sensing the d-c bus current and developing therefrom an alternating voltage which varies around a zero axis and reflects the actual power factor in the induction motor, the voltage above the zero axis representing the real current to the motor while the voltage below the axis represents the reactive current from the motor;

means for providing a reference voltage representing the desired power factor in the induction motor;

means for comparing said alternating voltage with said reference voltage to produce an error voltage which varies as a function of the difference between the desired power factor and the actual power factor;

and control means responsive to said error voltage for varying the amplitude of the a-c inverter voltage to change the reactive power in order to maintain the desired power factor.

2. A control system according to claim 1 wherein said reference voltage is a d-c voltage of predetermined magnitude, and wherein said comparing means includes a comparator to one input of which is applied said alternating voltage and to another input of which is applied said reference voltage, said comparator producing a rectangular shaped signal having a duty cycle proportional to the difference between the desired and actual power factors, and in which said comparing means also includes an integrating circuit for integrating said rectangular shaped signal to produce said error voltage.

3. A control system according to claim 1 wherein said control means varies the d-c voltage, produced by the d-c power supply, in order to adjust the amplitude of the a-c inverter voltage applied to the motor.

4. A control system according to claim 1 and including means for varying said reference voltage to permit adjustment of the desired power factor at which the motor will operate.

5. A control system according to claim 1 and including means responsive to said error voltage for maintaining the frequency of the a-c inverter voltage substantially constant, thereby maintaining the motor speed substantially constant, despite variations in the amplitude of the inverter voltage.

6. A control system according to claim 1 and including means responsive to said error voltage for increasing the frequency of the a-c inverter voltage as its amplitude decreases in order to compensate for any increased motor slip caused by the reduction in motor voltage.

7. A control system according to claim 1 and including a clamp circuit for limiting the amplitude of said error voltage to a predetermined maximum level.

8. A control system according to claim 1 and including means for delaying its operation until the frequency of the a-c inverter voltage reaches a predetermined level, thereby allowing start-up of the inverter.

9. A control system according to claim 1 and including means for enabling the operation of said comparing means, means for providing a command signal which is proportional to the frequency of the a-c inverter voltage, and additional means for comparing said command signal with a reference signal, representing a predetermined minimum frequency, to produce an enabling signal for rendering said enabling means operative any time the frequency of the a-c inverter voltage exceeds said predetermined minimum frequency.

* * * * *